Patented July 31, 1951

2,562,800

UNITED STATES PATENT OFFICE 2,562,800

LUBRICANT COMPOSITION OF MINERAL OIL CONTAINING A CONDENSATION PRODUCT OF ALIPHATIC-AROMATIC KETONE AND A SULFUR CHLORIDE

Eugene Lieber, Chicago, Ill., assignor to Standard Oil Development Company, a corporation of Delaware No Drawing. Application December 18, 1947, Serial No. 792,611

2 Claims. (Cl. 252—48.2)

This invention relates to a novel type of chemical condensation product and to methods of preparing such products and using them for various purposes, more particularly as pour depressors in waxy lubricating oils and as oiliness agents.

Broadly, this invention comprises the production of a novel type of condensation product by reacting an aliphatic aromatic ketone with a sulfur halide, preferably a sulfur chlorine compound such as sulfur monochloride, $S_2Cl_2$, and/or sulfur dichloride, $SCl_2$, especially to produce a high molecular weight but oil-soluble condensation product.

The aliphatic aromatic ketone to be used is preferably one having the general formula R—CO—Ar, in which R represents a saturated hydrocarbon group and Ar is an aromatic group. The group R may be straight, branched, or cyclic; it is preferably an aliphatic hydrocarbon group and preferably contains more than 10 carbon atoms. Examples include: lauryl, cetyl, tri-isobutyl, octadecyl, paraffin wax radical, petroleum naphthenyl, etc. The group Ar may represent benzene, naphthalene, anthracene, phenanthrene, diphenyl, toluene, xylene, phenol, alpha- and/or beta-naphthol, cresol, aniline, alpha-naphthylamine, tertiary-amyl-phenol, etc. Instead of using single pure ketone compounds, it is possible, and sometimes preferable, to use ketones derived by acylation of mixed aromatic hydrocarbons, phenols, etc., such as those obtained from coal tar fractions, as well as the so-called petroleum phenols, which are mixed alkylated phenols having an average composition corresponding approximately to a butyl phenol.

Although the preparation of such ketones does not constitute part of the present invention, it may be explained that they may be suitably prepared by condensing fatty acid chlorides, e. g., stearyl chloride

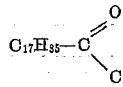

with a suitable aromatic compound, such as those obtained from coal-tar fractions; this condensation is usually carried out by means of a Friedel-Crafts catalyst.

The other reactant to be used according to this invention may be termed "sulfur halides" and, as such, I prefer to use the sulfur chlorides such as sulfur monochloride and/or sulfur dichloride.

Thus the primary chemical reaction involved in the present invention may be expressed by the following chemical equation:

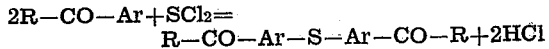

This reaction is probably accompanied or followed by other substantially similar reactions, in which the product of the first reaction is interlinked with additional molecules of the aliphatic aromatic ketone with the resultant formation of higher molecular condensation products which may be considered to have a linear-chain type structure. One graphic representation of such a product is as follows:

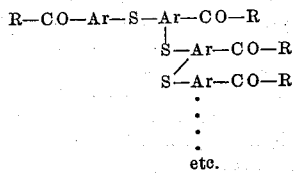

Thus the high molecular weight condensation products may be considered to have the general formula:

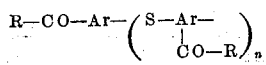

where $n$ is a subscript indicating the degree of condensation.

To effect the condensation, it is preferred to use a condensation catalyst such as $AlCl_3$, $ZnCl_2$, $BF_3$, $FeCl_3$, $TiCl_4$, etc.

The proportions in which the reactants should be used are about 5–50 parts by weight of sulfur chloride, preferably 20–40 parts by weight thereof, to 100 parts by weight of aliphatic aromatic ketones. The condensing agent is used in much smaller, i. e. catalytic, quantities such as about ½–15, preferably 2–10, parts by weight per 100 parts by weight of aliphatic aromatic ketone.

In carrying out the invention, the reaction temperature should be maintained between the approximate limits of 80° to 200° F., preferably in the range of 100–125° F., the reaction time will vary inversely with the temperature, but preferably should be about ½ to 10 hours, or usually 1 to 3 hours. Although not essential, a solvent can be used and of these, those inert to the reaction should be used, such as pretreated kerosene, carbon bisulfide, nitro benzene, dichlorbenzene, tetrachlorethane, etc.

When the reaction has been completed it is generally desirable to cool the reaction mixture and dilute it, e. g. with kerosene or tetrachlorethane. The catalyst is then decomposed by adding water, or alcohol-water mixture, dilute acids, etc. After settling, the aluminous sludge is drawn off. The kerosene or tetrachlorethane extract of the product is washed with water until free of acid and finally distilled under vacuum or with fire and steam to about 600° F., in order to remove the solvent and low-boiling products.

The distillation residue is the desired high molecular weight condensation product and is substantially non-volatile at about 600° F. In most cases it is a viscous oil and has a color ranging from red to dark brown. It is soluble in lube oils. In pale oils it has been found to impart a pleasing so-called Pennsylvania type of coloration, i. e., a greenish fluorescence with a deep-red through color.

The product of this invention has the property of modifying the crystal structure of waxes, such as paraffin wax, when added to compositions containing the same. For instance, when about .05 to 10%, preferably 2 to 5%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oils. A small amount of this wax modifier is also useful as a dewaxing aid for removing wax from mineral lubricating oils of undesirably high wax content. In similarly small amounts this wax modifier may also be incorporated into paraffin wax or compositions containing the same to be used for various purposes such as for coating or impregnating paper, etc., or for making various molded products.

The products of this invention also have the property of imparting so-called "extreme pressure" lubricating properties to oils when blended therein in suitable concentrations, say 2–15% and preferably 5–10%. That is, the products of this invention possess the property of imparting to the lubricants a very high film strength. This permits the use of smaller bearings and enables the journals and other types of bearings to be operated under more severe conditions of load, speed and the like. Such lubricating oils find valuable application for use in the so-called "breaking-in-oils."

Although when the condensation products of this invention are added to lubricating oils, primarily for the purpose of reducing the pour point thereof, they would naturally be added generally to paraffinic type of oils, such as Pennsylvania oils or fractions thereof, or certain paraffinic fractions derived from other types of crudes, yet when these condensation products are used as oiliness agents they may of course be added to lubricating oil base stocks derived from all types of crudes, such as not only the paraffinic oils but also naphthenic mixed base crudes, and even asphaltic base crudes.

As an additional feature of the invention, instead of first preparing an aliphatic aromatic ketone as indicated heretofore, and then reacting it with the sulfur halide as described, one may prepare the ketones by reacting an acyl halide with an aromatic compound in the presence of a Friedel-Crafts catalyst, and then immediately, without separating the resultant ketone from the catalyst, add the desired amount of sulfur halide, with or without additional quantities of catalyst, heat the reaction mixture to insure completion of the reaction to the desired stage for the production of the high molecular weight sulfur-containing condensation product, then hydrolyze and remove the catalyst, subject the reaction products to distillation, and recover the desired high molecular weight product as distillation residue, substantially as described hereinabove.

For the sake of illustration, but without desiring to limit the invention to the particular materials used, the following experimental data are given.

A series of tests were made in which five different ketones were treated with sulfur dichloride in the presence of aluminum chloride as catalyst, using 200 grams of the ketone in each case and various amounts of sulfur dichloride and aluminum chloride as indicated in the following table, and in all cases using a reaction temperature of 125° F. with a reaction time of three hours. The yield of products in all cases, and the sulfur content in a few cases, together with the pour point data, are also shown in the table. As indicated, the aluminum chloride was added last in tests 2 and 13, whereas in all of the other reactions the sulfur chloride was added last. For general reference, tests 1, 5, 7, 9 and 11 were also included as control tests, merely to show that before sulfurization the ketones per se had little pour-point depressing effect.

Table

| Test No. | Reactants | Gms. SCl₂ | Gms. AlCl₃ | Added SCl₂ | Last AlCl₃ | Yield, Gms. | Per Cent Sulfur | Pour Points (° F.), On Blends in +30° F. Pour Point Oil With Addition of— | |
|---|---|---|---|---|---|---|---|---|---|
| | | | | | | | | 2.0% | 5.0% |
| 1 | Stearyl Napthalene | | | | | | | +30 | +30 |
| 2 | ----do---- | 43 | 4.3 | | x | 171 | 4.9 | 0 | −20 |
| 3 | ----do---- | 43 | 10.0 | x | | 161 | | −10 | −20 |
| 4 | ----do---- | 86 | 10.0 | x | | 195 | 8.1 | −10 | −20 |
| 5 | Stearyl Benzene | | | | | | | +25 | +25 |
| 6 | ----do---- | 43 | 10.0 | x | | 123 | | | −5 |
| 7 | Wax-Benzene¹ | | | | | | | +5 | +5 |
| 8 | ----do---- | 60 | 12.0 | x | | 155 | 4.0 | −15 | −15 |
| 9 | Wax-Naphthalene¹ | | | | | | | +20 | +15 |
| 10 | ----do---- | 43 | 10.0 | x | | 150 | 3.6 | −15 | −15 |
| 11 | Stearyl-Phenol | | | | | | | +10 | +15 |
| 12 | ----do---- | 57 | 12.0 | x | | 166 | | −15 | −20 |
| 13 | ----do---- | 57 | 12.0 | | x | 159 | | −15 | −20 |
| 14 | ----do---- | 40 | 8.0 | x | | 150 | | −10 | −15 |

¹ Made from wax acids obtained by oxidation of paraffin wax. The acids used in these experiments have an average molecular weight about equal to that of stearic acid.

It is noted from the above table that reaction of the ketone with sulfur dichloride effected a very substantial reduction or depressing of the pour point as compared with the untreated ketone tested in a lubricating oil base stock having an original pour point of +30° F. The untreated ketones per se when tested in 2% and 5% blends in the same lubricating oil base stock, either had no pour-depressing effect at all or reduced it somewhat to various temperatures ranging down to +5° F.; but on the other hand, the treated ketones produced blends having pour points at least 20 or 30°, and in some cases even 50° F., lower than the blend obtained with the untreated ketone. This is indeed a surprising result, in view of the fact that the primary starting material, namely, the ketone, is a chemical compound having a relatively simple chemical structure.

Also to illustrate the unexpected value of these novel condensation products as oiliness agents, 10 parts of the product prepared in test 2 were blended in a naphthenic type oil having a viscosity of 210 Saybolt seconds at 210° F. This was tested for extreme pressure properties on the standard S. A. E. "Extreme Pressure Testing Machine." (For description of this test see S. A. E. Journal Transactions for 1936, page 293, article by G. L. Neely.) The following results were obtained:

| | Pounds carried before failure |
|---|---|
| Original oil | 20 |
| Original oil+10% product #2 | 110 |

It will be noted that a very material improvement in extreme pressure qualities of the oil has been obtained.

The following laboratory results are given to show that the reaction products used as lubricating additives according to this invention are radically different from those obtained by first preparing an alkylphenolsulfide and acylating the resulting product.

328 gms. of p-tertiary amyl phenol was dissolved in ethylene dichloride (500 cc.) contained in a 2-liter, 3-necked flask equipped with a refluxing condenser. While stirring, 103 grams of sulfur dichloride ($SCl_2$) was added over a period of 30-40 minutes holding the temperature at 100-130° F. After the addition of the $SCl_2$ the reaction temperature was raised to reflux (145° F.) and held thereat for one hour. The product was then recovered by removing the ethylene dichloride by distillation taking off the last trace of solvent under high vacuum. A yield of 448.6 grams of p-tertiary amyl phenol sulfide was obtained as product.

In reacting this product with stearoyl chloride, the procedure of U. S. Patent 2,319,662, Example I, page 2, was followed as accurately as possible in this preparation. 92 grams of tertiary amyl phenol sulfide (prepared as described above) was dissolved in 70 cc. of ASTM naphtha, and 153 grams of stearoyl chloride was added to the reaction mixture with vigorous stirring. After the addition of the stearoyl chloride the reaction mixture was heated to reflux (160° F.) and held thereat for 30 minutes. After cooling, 23 grams of anhydrous aluminum chloride was added and the resulting mixture heated to reflux temperature (160-165° F.) and held thereat for two hours. The reaction mixture was then cooled to 90° F. and 200 cc. of 10% cold hydrochloric acid added. After stirring thoroughly, 150 grams of toluene was added and the reaction mixture allowed to settle. The aqueous layer was then separated and discarded. The solvent layer was washed once with warm 10% hydrochloric acid and twice with hot water. The product was then recovered by removing the solvent by distillation taking off the last traces under high vacuum. A yield of 238 grams of a reddish brown heavy liquid was obtained as product and it was tested by blending in various concentrations in a waxy lubricating oil having an original pour point of +30° F. and determining the pour point of the resulting blends by the standard ASTM procedure. The following results were obtained:

| | Pour point (°F.) |
|---|---|
| Blend oil | +30 |
| Blend oil+0.25% product | +30 |
| Blend oil+0.50% product | +30 |
| Blend oil+1.0% product | +30 |
| Blend oil+2.0% product | +25 |

These data show that if p-tertiaryamyl phenolsulfide is acylated with stearoyl chloride, the resultant product is found to have substantially no pour depressing properties whatsoever, and therefore is an entirely different product than that of the present invention.

This application is a continuation-in-part of application Serial No. 424,541, filed December 26, 1941, which has been abandoned.

It is not intended that this invention be limited to any of the specific examples which were given merely for the sake of illustration, nor to any theory as to the mechanism of the operation of the invention, but only by the appended claims in which it is intended to claim all novelty inherent in the invention, as well as other modifications coming within the scope or spirit of the invention.

I claim:

1. A composition consisting essentially of a normally non-volatile hydrocarbon material and a pour depressing amount of a high molecular weight oil-soluble product obtained by reacting about 100 parts by weight of a ketone having the general formula R—CO—Ar, in which R represents an aliphatic group having more than 10 carbon atoms, and Ar is an aromatic group, with about 5 to 50 parts by weight of a sulfur chloride in the presence of about ½ to 15 parts by weight of a Friedel-Crafts catalyst at a temperature of about 80-200° F., to produce a high molecular weight but oil-soluble condensation product, hydrolyzing and removing the catalyst, and distilling the reaction product to obtain as distillation residue the desired high molecular oil-soluble product.

2. A lubricating composition consisting essentially of a mineral base lubricating oil and a pour depressing amount of a high molecular weight oil-soluble condensation product made by reacting about 100 parts by weight of a ketone having the general formula R—CO—Ar, in which R is an aliphatic group having more than 10 carbon atoms, and Ar is an aromatic group, with about 20-40 parts by weight of sulfur dichloride in the presence of about 2-10 parts by weight of aluminum chloride at about 80-200° F., hydrolyzing and removing the catalyst and distilling the reaction product to about 600° F. under reduced pressure to obtain a high molecular weight oil-soluble distillation residue.

EUGENE LIEBER.

(References on following page)

REFERENCES CITED

The following references are of record in the file of this patent:

UNITED STATES PATENTS

| Number | Name | Date |
|---|---|---|
| 1,756,817 | Ellis | Apr. 29, 1930 |
| 2,147,547 | Reiff et al. | Feb. 14, 1939 |
| 2,174,248 | Mikeska et al. | Sept. 26, 1939 |
| 2,239,534 | Mikeska et al. | May 20, 1941 |
| 2,242,260 | Prutton | May 20, 1941 |
| 2,319,662 | Cook et al. | May 18, 1943 |
| 2,384,935 | Lieber | Sept. 18, 1945 |

OTHER REFERENCES

Airan et al.: J. Indian Chem. Soc., vol. 22, pages 359–363 (1945). Abstracted in Chemical Abstracts, vol. 40, 6455 (1946).

Airan et al.: J. Univ. Bombay, vol. 9, part 3, pages 115–126 (1940). Abstracted in Chemical Abstracts, vol. 35, 6950–6951 (1935).